April 4, 1961
R. B. MATTHEWS
2,977,966
FLUID PRESSURE OPERATED CONTROL DEVICES
Filed Oct. 17, 1956
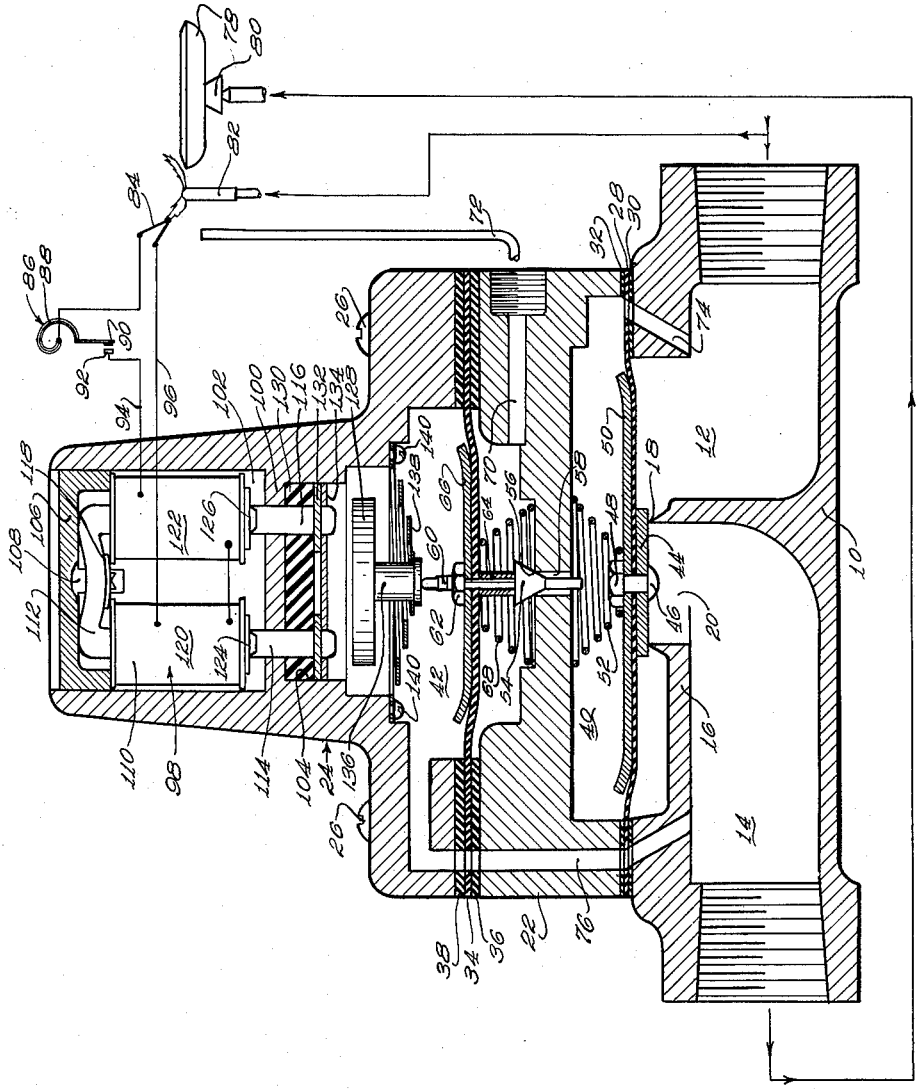
INVENTOR.
Russell B. Matthews
BY
Seegert & Schwalbach
Attys United States Patent Office 2,977,966
Patented Apr. 4, 1961

2,977,966

FLUID PRESSURE OPERATED CONTROL DEVICES

Russell B. Matthews, Wauwatosa, Wis., assignor to Baso Inc., a corporation of Wisconsin Filed Oct. 17, 1956, Ser. No. 616,505

3 Claims. (Cl. 137—66)

The present invention pertains to electroresponsive fluid pressure operated control devices.

In supplying fluid fuel to certain fuel burning apparatus, it has been found desirable, if not necessary, to provide, in addition to valve means for selectively turning off and on the fluid flow, pressure regulating means for maintaining the pressure of the fluid fuel supplied to the apparatus at a predetermined level. Such pressure regulation of fluid flow is necessary if it is desired to maintain substantially constant the amount of heat afforded by the main fuel burner of the apparatus despite substantial variations and fluctuations in the pressure of the fluid fuel as received from the source. Heretofore, it has been necessary to employ a separate device in the supply conduit to perform the pressure regulating function. This device, of course, was in addition to the usual on-off valve, and therefore presented certain shortcomings, the more prominent of which, perhaps, was that the cost entailed in providing separate housings and duplicate operating parts for each of the on-off valve and regulator became significant in certain installations to the point where the regulator was purposely omitted for the sake of economy. Further, the cumbersome arrangement resulting from connecting several valve housings in series relation in a fuel supply conduit prevented installation in certain closely confined areas, again causing the regulator to be omitted.

It is therefore an object of the present invention to provide a single flow control device which affords both on-off control and pressure regulation control of fluid fuel.

Another object is to provide a pressure operated diaphragm valve device having means for varying the amount of fluid bled from the pressure chamber thereof and thereby the rate of flow of the fluid controlled by said device.

Another object is to provide a device of the character described wherein the means for varying the amount of fluid bled from the pressure chamber is responsive to the pressure at the outlet of said device and therefore maintains the fluid pressure at the outlet at a preselected value in spite of variations in the inlet pressure.

Another object is to provide in a pressure operated diaphragm valve device wherein the outlet pressure is maintained substantially constant by control of the rate of bleeding of the operating fluid, condition responsive means for interrupting bleeding of said operating fluid and thereby terminating fluid flow through said valve device upon occurrence of a given condition.

Another object of this invention is to provide in a pressure operated diaphragm valve device of the aforementioned character, a single valve member in the bleed passage of said valve device and actuating means for said bleed valve including fluid pressure responsive means for varying the position of said valve in accordance with variations in fluid pressure at the outlet of said device, and electroresponsive means operable in one position to overcall said pressure responsive means and position said auxiliary valve in its bleed flow-preventing position for shutting off fluid fuel flow through said valve device.

Another object of this invention is to provide in a pressure operated diaphragm valve device of the class described, temperature responsive switch means in circuit with said electroresponsive overcalling means for permitting and preventing fuel flow through said control device in accordance with variations in temperature.

Another object of this invention is to provide a pressure operated diaphragm valve device, wherein the electroresponsive means is deenergizable to overcall said pressure responsive means and dispose said auxiliary valve in its bleed flow-preventing position for shut-off of fluid fuel flow through said valve device, said electroresponsive means being energizable by current from a thermoelectric generator and under the control of the thermostatic switch, wherefore cooling of said thermoelectric generator or opening of said thermostatic switch effects interruption of fluid flow through said control device.

Another object is to provide fluid flow control apparatus including an electroresponsive pressure operated diaphragm valve device of the class described for control of fluid fuel flow to a main burner, there being an ignition burner for said main burner and for heating of a thermoelectric generator in circuit with the electroresponsive means of said valve device, said valve device affording regulation of the pressure of the fluid fuel supplied to said main burner but only when said electroresponsive means is energized by current from said thermoelectric generator.

Another object is to provide fluid flow control apparatus as above described wherein a thermostatic switch is provided in circuit with the thermoelectric generator to control the energization of the electroresponsive means in accordance with the temperature within a space being heated by the main burner to thereby provide thermostatic control in addition to the aforementioned pressure regulation.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawing which is a sectional view of an embodiment of the present invention shown, more or less schematically, connected to various elements of a fluid fuel burning apparatus.

Referring to the drawing, it shows a main valve body 10 formed with an inlet chamber 12 and an outlet chamber 14 for connection to contiguous sections of a main burner fuel supply conduit (not shown). A partition wall 16 is formed in body 10 for separation of inlet 12 and outlet 14 and comprises a valve seat 18 affording a flow control port 20.

An auxiliary valve body 22 and an operator housing 24 are fixed to control body 10 over an opening in the upper wall thereof by means of bolts 26. A main movable partition or flexible diaphragm 28 is fixed between valve bodies 10 and 22 about its marginal edge. Sealing means such as gaskets 30 and 32 are installed on opposite sides of the marginal edge of diaphragm 28 to prevent escape of fluid fuel. An auxiliary movable partition or flexible diaphragm 34 is marginally clamped between auxiliary valve body 22 and operator housing 24, there being sealing means such as gaskets 36 and 38 installed on opposite sides of the marginal edge of said diaphragm to prevent escape of fluid fuel. Such positioning of main diaphragm 28 provides a pressure chamber 40 within auxiliary valve body 22 on one side of said diaphragm, while the other side thereof is exposed to the fluid pressure in inlet chamber 12. Such positioning of auxiliary diaphragm 34 provides a pressure chamber 42 within housing 24 on one side of said diaphragm, while the other side thereof is exposed to atmospheric pressure as will hereinafter appear.

A flow control member or valve disc 44 preferably having a facing formed of resilient material such as rubber, is provided for flow control cooperation with valve seat 18 and is fixed to main diaphragm 28 by a bolt 46 and a nut 48 which clamp said diaphragm between a back-up plate or reenforcing member 50 and said valve. Back-up plate 50 functions as a stiffening member for the diaphragm and also serves to define the effective area of diaphrgam 28 as is well known in the art. A helical compression spring 52 is provided between back-up plate 50 and a wall of auxiliary valve body 22 to bias valve disc 44 toward flow-preventing position relative to valve seat 18.

A pilot valve or bleed flow control member 54 preferably having a facing formed of resilient material such as rubber, is provided for flow control cooperation with a valve seat 56 provided by a flow control port 58 formed in auxiliary valve body 22. As shown in the drawing, port 58 affords communication between pressure chamber 40 and the underside of auxiliary diaphragm 34 whenever valve 54 is in its flow-permitting position. Valve 54 has a stem 60 which projects through auxiliary diaphragm 34 and a back-up plate or reenforcing member 66, said valve being fixed to said diaphragm by clamping of said diaphragm and back-up plate between a nut 62 threaded on said stem and a tubular spacer 64. Back-up plate 66 functions as a stiffening member for auxiliary diaphragm 34 and also serves to define the effective area thereof as is well known in the art. A helical compression spring 68 is provided between auxiliary diaphragm 34 and a wall surface of auxiliary valve body 22 to bias flow control member 54 toward its extreme flow-permitting position relative to valve seat 56.

Auxiliary valve body 22 is formed with a passageway 70, and threadably connected to said passageway to cooperate therewith for exposing the underside of diaphragm 34 to the surrounding atmosphere, is a bleed conduit 72 which terminates adjacent a pilot burner 82 to be described more fully hereinafter. A fluid passage 74 is provided between inlet chamber 12 and pressure chamber 40 through openings formed in valve body 10, gasket 30 and diaphragm 28. A fluid passageway 76 is provided between outlet chamber 14 and auxiliary pressure chamber 42 through openings formed in main valve body 10, main diaphragm 28, gaskets 30 and 32, auxiliary valve body 22, auxiliary diaphragm 34, gaskets 36 and 38, and operator housing 24.

As schematically shown in the drawings, the conduit leading from outlet chamber 14 affords fuel supply to a main fuel burner 78 through a mixing chamber 80. A pilot burner or ignition burner 82, juxtaposed with respect to the main burner for ignition thereof, is supplied with fluid fuel by means separate from or independent of the subject fluid pressure operated control device as schematically shown in the drawings. Positioned adjacent the pilot burner 82 for heating thereby, is a thermoelectric generator or thermocouple 84 connected in circuit with a condition responsive switch or thermostat 86. The circuit of thermoelectric generator 84 includes lead wires 94 and 96 which may be arranged in coaxial fashion as is well understood in the art. Lead wires 94 and 96 are connected to an electromagnetic operator 98 mounted within operator housing 24.

As shown in the drawing the thermostat 86 may comprise a bi-metal element 88 carrying a movable low resistance contact 90 for cooperation with a stationary low resistance contact 92, said bi-metal element being deformable in response to variations in temperature thereof for making or breaking engagement of contacts 90 and 92 as is well understood in the art. It is to be understood that the present invention is not to be limited to the use of the particular condition responsive means 86 shown in the drawings but includes any suitable thermostat structure. For example, the thermostat 86 may take the form of low resistance electrical contacts encapsulated within an expansible and contractible hemetically sealed enclosure containing a sub-atmospheric expansible and contractible volatile fluid fill, as generally preferred for use in low power circuits, such as those powered by a thermoelectric generator.

Operator housing 24 is formed of non-magnetic material, for example aluminum, and has a transverse partition 100 separating a rectangular outer chamber or cavity 102 from a rectangular cavity 104. The open outer end of chamber 102 is closed by an adjustable cup-shaped cover 106 formed with an integral axial lug 108 on which an electromagnet 110 is carried. The cover 106 and hence electromagnet 110 may be locked in any selected position by any desired means such as a set screw (not shown) threaded through the housing 24 and engaging said cover.

Electromagnet 110 comprises a generally U-shaped frame 112 of magnetically permeable steel, for example the alloy designated by the number 4750. Frame 112 has a pair of spaced parallel legs 114 and 116 which may be of rectangular cross section, and the transverse portion connecting said legs is formed with an aperture for receiving the lug 108 of the cover 106 as shown. The frame 112 is rigidly held against the cover 106 by a friction clip 118 pressed on the lug 108 or by other suitable means. Energizing coils 120 and 122 are mounted on the legs 114 and 116 respectively, said coils engaging the peripheral portions of the cover 106 and the clip 118 at one end and being rigidly held in operative position by friction clips 124 and 126 pressed on the legs 114 and 116. The frame legs 48 and 49 extend through partition 100 and terminate in pole faces which are cooperable with an armature 128.

Disposed within the cavity 104 is a seal 130 of resilient material, for example synthetic rubber, said seal being apertured to snugly receive the magnet frame legs 114 and 116 as shown. Overlying the seal 130 within the cavity 104 are non-magnetic rectangular retainer plates 132 and 134 the latter being preferably formed of stainless steel. The retainer plate 134 is peripherally staked, to hold the latter in operative position wherein it acts through the plate 132 to place the seal 130 under compression to afford a hermetic seal between the cavities 102 and 104 and around the magnet frame legs 114 and 116.

The electromagnetic operator 98 can be used with either alternating current or direct current with slight modification. Thus, although the drawing shows electromagnetic operator 98 connected in circuit with thermoelectric generator 84, it is to be understood that said electromagnetic operator 98 could be powered from an outside source, for instance alternating current, and under control of a switch responsive to energization of thermoelectric generator 84. In such a case the plate 132 takes the form of a shading plate, preferably of aluminum, and the frame legs 114 and 116 each terminate in a pair of spaced pole faces instead of a single pole face.

Armature 128 is formed of magnetically permeable steel, for example the alloy designated by the numeral 4750, and is preferably circular in shape. Abutment means in the form of an armature stem or overcalling member is connected at one end to armature 128 and at the other end to a biasing member 138 fixed at its marginal edge to operator housing 124 as by means of screws 140. Biasing member 138 biases armature member 128 toward the separated relation with respect to magnet frame 112 and at the same time biases the armature stem 136 coaxially toward engagement with the pilot valve stem 54 with sufficient force to overcome the bias of spring 68 and move the pilot valve member 54 to the closed position shown in the drawing when the electromagnet 110 is deenergized.

The operation of the improved valve device will now be described.

With thermostat contacts 90 and 92 disengaged due to response of thermostatic switch 86 to a predetermined high temperature, electromagnetic operator 98 is unenergized and biasing member 138 maintains armature 128 separated from magnet frame 112 and valve member 54 in flow-preventing engagement with valve seat 56, overcoming the bias of spring 68 in so doing. Valve member 54 assumes this position due to the abutting engagement between the end of armature stem 136 and the end of valve stem 60. Under these conditions, fluid fuel is permitted to flow from inlet chamber 12 to pressurize the chamber 40 through passageway 74, said pressure aiding compression spring 52 in retaining valve member 44 in its flow-preventing position in engagement with valve seat 18.

With the pilot burner 82 ignited and the hot junction of thermoelectric generator 84 heated thereby, engagement of contacts 90 and 92 by response of the thermostat 86 to a predetermined low temperature, effects energization of electromagnet windings 120 and 122 by current from thermoelectric generator 84. Energized windings 120 and 122 create magnetic flux flow in frame 112, said flux linking armature 128 and causing the same to be attracted into engagement with frame legs 114 and 116 against the force of biasing means 138. Such movement of armature 128 interrupts the abutting engagement between armature stem 136 and valve stem 60, and the bias exerted on the latter by the biasing means 138, whereupon auxiliary diaphragm 34 is moved upwardly by compression spring 68, since both sides of auxiliary diaphragm 34 are exposed to atmospheric pressure. Such movement of auxiliary diaphragm 34 moves pilot or auxiliary valve member 54 to flow-permitting position, whereupon the fluid fuel within pressure chamber 40 is permitted to bleed to the atmosphere through flow control port 58, passageway 70 and bleed conduit 72. I prefer to position the end of bleed conduit 72 adjacent pilot burner 82 so that the fluid bled from chamber 40 will be burned by the pilot flame rather than being expelled into the surrounding atmosphere. Such bleeding of pressure from within chamber 40 permits the fluid pressure within inlet chamber 12 to move main diaphragm 28 upwardly against the biasing force of compression spring 52, thereby moving main valve 44 to flow-permitting position with respect to valve seat 18. Fluid fuel is thus permitted to flow from inlet chamber 12 to main burner 78 through flow control port 20, outlet chamber 14, and the main fuel conduit (not shown). As is well known in the art, the fuel emitted from main burner 78 is ignited by the flame at pilot burner 82.

Flow of fluid fuel through the port 20 to main burner 78 affords an increase in pressure within outlet chamber 14 and hence an increase in pressure within auxiliary pressure chamber 42 through passageway 76. Such increase in fluid pressure within auxiliary chamber 42 exerts a force on auxiliary diaphragm 34 tending to move the same against the force of compression spring 68 and in a direction to move the auxiliary valve member 54 toward valve seat 56. Such movement of auxiliary valve member 54 restricts or meters the amount of fluid fuel bled from pressure chamber 40 and causes the fluid pressure on the upper surface of main diaphragm 28 to increase and effect movement of main valve 44 toward its flow-preventing position. Such movement of main valve 44 decreases the amount of fluid fuel flow between inlet chamber 12 and outlet chamber 14, decreasing the pressure within the latter and hence within auxiliary pressure chamber 42, permitting compression spring 68 to move auxiliary valve member 54 away from its valve seat 56. This sequential operation continues until a predetermined fluid pressure is established within outlet chamber 14, the variations in fluid pressure in said chamber and hence the variations in the position of valves 54 and 44 becoming successively smaller until the predetermined outlet pressure is reached. In this event the fluid pressure on diaphragm 34 is balanced by the biasing effect of compression spring 68 thereon. It will thus be readily apparent to those persons skilled in the art, that compression spring 68 must not have a constant spring force, but rather must have a force which is variable to provide a predetermined range thereof.

The above explained operation provides fluid fuel flow at constant pressure to main burner 78 whenever electromagnetic operator 98 is initially energized. However, since sources of fluid fuel supply are generally incapable of supplying fluid fuel at a constant pressure, it is desirable to provide means for compensating for any change in the pressure of the fluid fuel supplied from the source so as to maintain a predetermined flame at the main burner. It will be noted that the aforedescribed bleed control means will compensate for such variations in fluid pressure since any variation in fluid pressure within inlet chamber 12 causes a corresponding change in fluid pressure within outlet chamber 14 whenever valve disc 44 is in flow-permitting position. Such variation in pressure within chamber 14 causes variation in the position of auxiliary valve 54 and hence variation in the position of valve 44 in the same manner as above explained with regard to regulation of fluid pressure during initial energization of electromagnetic operator 98. That is to say, when the pressure of the fluid fuel from the source increases, thereby increasing the pressure within chambers 12 and 14, auxiliary valve 54 decreases the amount of fluid bled from within pressure chamber 40, causing valve member 44 to be moved toward its flow-preventing position to decrease the flow of fluid between chambers 12 and 14, whereby the fluid pressure drop between the latter is increased so as to maintain the fluid pressure within outlet chamber 14 at a predetermined level.

Conversely, any decrease in pressure of the fluid fuel from the source of supply causes pressure drops in chambers 12 and 14, whereupon auxiliary valve 54 permits increased bleeding of fluid from chamber 40 to afford movement of valve member 44 to an increased flow-permitting position and thereby increased flow of fluid fuel between chambers 12 and 14, thereby decreasing the pressure drop between chambers 12 and 14 so as to maintain the fluid pressure within chamber 14 at the predetermined level.

Deenergization of electromagnetic operator 98 for example by disengagement of thermostat contacts 90 and 92 in response to a predetermined high temperature, or by cooling of the hot junction of thermoelectric generator 84 on extinguishment of the flame at pilot burner 82, permits biasing means 138 to return armature 128 to its unattracted position shown against the bias of spring 68. Such armature movement, of course, causes the end of armature stem 136 to abuttingly engage the adjacent end of valve stem 60 and move auxiliary diaphragm 34 and valve member 54 in a valve closing direction to overcall the control of the pilot valve member normally afforded by said diaphragm. Closure of auxiliary valve 54 permits the fluid pressure within pressure chamber 40 to increase to a point where compression spring 52 returns valve member 44 to its flow-preventing position with respect to valve seat 18. In this manner fuel flow to main burner 78 is interrupted upon disengagement of contacts 90 and 92 or upon cooling of thermoelectric generator 84.

If pilot burner 82 should remain ignited so as to adequately heat the hot junction of thermocouple 84, valve member 44 will be cycled between its flow-preventing and flow-permitting positions in accordance with the demands of the thermostat 86. In addition, whenever the main valve member 44 is in flow-permitting position, the pressure of the fluid fuel supplied to main burner 78 is regulated by the aforedescribed bleed control means to maintain the pressure of such fuel at a substantially constant value regardless of substantial variations in the pressure of the fluid fuel supplied from the source.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. A unitary control device comprising, a valve body having an inlet and an outlet, a main valve, means including a first pressure responsive flexible diaphragm for actuating said main valve between two extreme flow controlling positions and defining a pressure chamber in continuous communication with said inlet and having a vent passage opening externally of said valve body, a pilot valve member controlling the flow through said vent passage and movable rectilinearly between controlling positions to thereby control the operation of said actuating means and hence the position of said main valve, a second pressure responsive flexible diaphragm carrying said pilot valve member for movement of said pilot valve member and thereby said main valve to a plurality of flow controlling positions, said second diaphragm being actuatable substantially independently of fluid flow through said vent passage and in accordance with variations in fluid pressure at said outlet, means in said valve body including an overcalling member movable into and out of engagement with said pilot valve member and operative to normally overcall said pilot valve operating means and effect disposition of said pilot valve member in a position effecting disposition of said main valve in one of its extreme positions, and electroresponsive means in said valve body including an electromagnet and a co-operating armature movable between attracted and retracted positions and fixed to said overcalling member for actuation thereof, said electroresponsive means when energized rendering said overcalling means inoperative to thereby permit controlling movement of said pilot valve means and main valve under the control of said operating means.

2. A control device comprising a valve body having an inlet and an outlet, main actuating means including a main flexible diaphragm defining a main pressure chamber in continuous communication with said inlet and having a vent passage opening externally of said valve body, a main valve member carried by said main diaphragm for actuation between closed and full open positions by movement of said diaphragm, a first spring biasing said main valve member toward closed position, a pilot valve member movable rectilinearly between closed and full open positions for controlling the flow through said vent passage, a second spring biasing said pilot valve member toward full open position, auxiliary actuating means including an auxiliary flexible diaphragm defining an auxiliary pressure chamber isolated from said vent passage and in continuous communication with said outlet, said pilot valve member being carried by said auxiliary diaphragm for rectilinear actuation in a closing direction against the bias of said second spring in response to predetermined pressure at said outlet to thereby effect movement of said main valve in a closing direction for regulation of the pressure at said outlet, and overcalling means including an armature mounted for rectilinear movement coaxially of said pilot valve member and having abutment means, an electromagnet cooperable with said armature, and a third spring biasing said armature toward a retracted position with respect to said electromagnet and with sufficient force to cause said abutment means to engage said pilot valve member and move the latter closed against the bias of said second spring, energization of said electromagnet causing rectilinear movement of said armature toward attracted position with respect thereto for movement of said abutment means out of engagement with said pilot valve means to permit actuation of the latter by said auxiliary actuating means and said second spring for control of the actuation of said main valve member by said main actuating means and said first spring.

3. A unitary control device comprising, a valve body having an inlet and an outlet, a main valve, means including a first pressure responsive flexible diaphragm for actuating said main valve between two extreme flow controlling positions and defining a pressure chamber in continuous communication with said inlet and having a vent passage opening externally of said valve body, a pilot valve member controlling the flow through said vent passage and movable between controlling positions to thereby control the operation of said actuating means and hence the position of said main valve, a second pressure responsive flexible diaphragm carrying said pilot valve member for movement of said pilot valve member and thereby said main valve to a plurality of flow controlling positions, said second diaphragm being actuatable substantially independently of fluid flow through said vent passage and in accordance with variations in fluid pressure at said outlet, means in said valve body including an overcalling member movable into and out of engagement with said pilot valve member and normally operative to overcall said pilot valve operating means and effect disposition of said pilot valve member in a position effecting disposition of said main valve in one of its extreme positions, and electroresponsive means in said valve body including an electromagnet and a cooperating armature movable between attracted and retracted positions and fixed to said overcalling member for actuation thereof, said electroresponsive means when energized rendering said overcalling means inoperative to thereby permit controlling movement of said pilot valve means and main valve under the control of said operating means.

References Cited in the file of this patent

UNITED STATES PATENTS

| | | |
|---|---|---|
| 1,546,356 | Anderson | July 21, 1925 |
| 1,800,280 | Branche | Apr. 14, 1931 |
| 2,265,210 | Waddell | Dec. 9, 1941 |
| 2,412,490 | Biggle | Dec. 10, 1946 |
| 2,446,718 | Ray | Aug. 10, 1948 |
| 2,572,175 | McPherson | Oct. 23, 1951 |
| 2,650,617 | Wasser | Sept. 1, 1953 |
| 2,687,738 | Thornberg | Aug. 31, 1954 |
| 2,877,978 | Rider | Mar. 17, 1959 |

FOREIGN PATENTS

| | | |
|---|---|---|
| 142,312 | Austria | July 10, 1935 |
| 953,404 | France | May 23, 1949 |